UNITED STATES PATENT OFFICE 2,580,695

ALPHA,ALPHA'-DITHIODIALDEHYDES

Warren D. Niederhauser, Philadelphia, Pa., assignor to Rohm & Haas Company, Philadelphia, Pa., a corporation of Delaware No Drawing. Application December 1, 1950, Serial No. 198,739

3 Claims. (Cl. 260—601)

This invention relates to new dialdehydes containing disulfide groups and to a process for preparing them. It relates to the preparation of alpha,alpha'-dithioaldehydes which have the following general formula

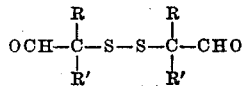

in which R in both occurrences is the same alkyl group of one to eighteen carbon atoms and R' in both occurrences is the same alkyl group of one to eighteen carbon atoms or an aromatic hydrocarbon group; i. e., an aryl group.

These compounds are made by reacting two moles of an aldehyde of the general formula

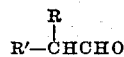

in which R and R' have the same significance as is set forth above with a mole of sulfur monochloride or sulfur dichloride. The reaction which takes place is represented by this equation

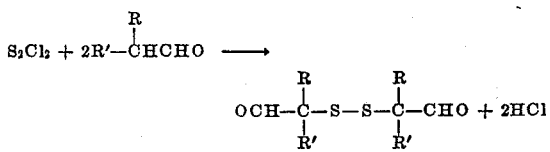

Sulfur monochloride is preferred over sulfur dichloride because the former usually provides higher yields of the product than does the latter.

The reactants combine readily at temperatures from about —30° to 100° C. As is customary, the reaction occurs more rapidly as the temperature is raised. Also, greater proportions of by-products may be formed at the higher temperatures and consequently, it is preferred that the reaction be carried out at a temperature from about 10° C. to about 80° C.

The reaction can be carried out at sub-atmospheric or super-atmospheric pressures, but there does not appear to be any substantial advantage in doing so since good results are obtained at ordinary atmospheric pressure.

The reaction is conveniently carried out in the presence of an inert organic solvent, although a solvent is not essential to the reaction. The word "inert" is used in the accepted sense as indicating that the solvent does not react with the reactants or products under the conditions of the instant reaction. Examples of such suitable solvents include aliphatic or aromatic solvents, such as petroleum ether and benzene, and chlorinated hydrocarbons such as carbon tetrachloride and chlorobenzene.

As shown above, the aldehydes which react with the sulfur chloride carry two hydrocarbon groups, represented by R and R' in the general formula, on the alpha carbon atom. One of these groups, R', can be an aryl hydrocarbon radical such as phenyl, tolyl, xylyl, naphthyl, ethylphenyl, p-tert.-butylphenyl and the like; but the other group, R, must be an alkyl group. In fact, the reaction proceeds more satisfactorily and gives better yields in those cases where both substituting groups on the aldehyde are alkyl groups such as methyl, ethyl, n-butyl, isobutyl, tert.-butyl octyl, lauryl, tetradecyl, and octadecyl groups including the isomeric forms. The alkyl and aryl hydrocarbon radicals do not, themselves, take part in the reaction and, consequently, the size and form of the radicals are not significant factors insofar as the course of the reaction is concerned but they do, of course, contribute to the physical properties of the products.

The following examples, wherein all parts are by weight, serve to show how the products of this invention are prepared and it is to be understood that any aldehyde described above reacts with sulfur chloride in the same manner as those shown in these examples.

Example 1

A solution of 289 parts of isobutyraldehyde in 460 parts of carbon tetrachloride was held at 40° C.-50° C. for twenty minutes during which time there was added to the stirred solution 270 parts of sulfur monochloride. Hydrogen chloride was copiously liberated during the mixing. The reaction mixture was held at 30° C.-40° C. for two hours. The mixture was then held at 30° C.-40° C. for an additional period of 16 hours while a current of carbon dioxide was passed through it in order to remove the hydrogen chloride. The solution was then fractionally distilled and a 77% yield was obtained of a dialdehyde, boiling at 100° C.-110° C. at 1 mm. pressure. This compound of the formula

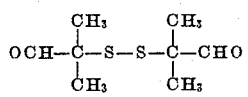

was a pale yellow oil which, on analysis, had a carbonyl number of 535 (theoretical, 546) and a sulfur-content of 30.9% (theoretical, 31.1%). It was proven to have disulfide groups by the method of Siggia as given in "Quantitative Analysis via Functional Groups" (John Wiley & Sons, Inc., N. Y. C.); and the bis-semicarbazone made from the dialdehyde contained 20.3% sulfur by analysis as against a theoretical value of 20.0%.

*Example 2*

In a similar manner, a solution of 128 parts of 2-ethylhexaldehyde in 320 parts of carbon tetrachloride was stirred and held at 40° C.–45° C. while to it there was added 67.5 parts of sulfur monochloride. The resultant mixture was then held at 30° C. for two days while a slow stream of carbon dioxide bubbled through it. The solution was then fractionally distilled under reduced pressure and 157 parts (98% yield) were obtained of a crude dialdehyde which had a carbonyl number of 340 (theoretical value, 353) and a sulfur-content of 20.9% (theoretical value, 20.1%). This was further purified by distillation, and analysis of the purified product confirmed its structure:

$$OCH-\underset{\underset{C_4H_9}{|}}{\overset{\overset{C_2H_5}{|}}{C}}-S-S-\underset{\underset{C_4H_9}{|}}{\overset{\overset{C_2H_5}{|}}{C}}-CHO$$

The products of this invention are useful as cross-linking agents and as chemical intermediates. Thus, they react with chlorine to give sulfenyl chlorides, of the general formula

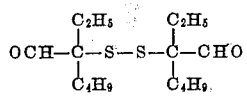

which in turn add to polyolefinic compounds to give polyaldehydes according to this equation:

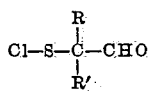

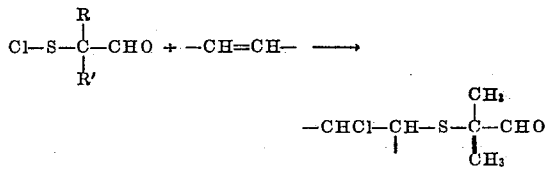

Reduction of the dithiodialdehydes yields mercapto-aldehydes,

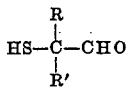

I claim:
1. Alpha,alpha'-dithiodialdehydes having the general formula

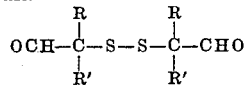

in which R in both occurrences is the same alkyl group of one to eighteen carbon atoms and R' in both occurrences is a member of the class consisting of alkyl groups containing one to eighteen carbon atoms and aryl groups.

2. The alpha,alpha'-dithioaldehyde having the formula

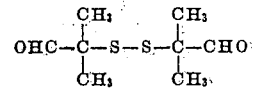

3. The alpha,alpha'-dithioaldehyde having the formula

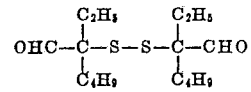

WARREN D. NIEDERHAUSER.

REFERENCES CITED

The following references are of record in the file of this patent:

UNITED STATES PATENTS

| Number | Name | Date |
|---|---|---|
| 1,559,393 | Whittelsey et al. | Oct. 27, 1925 |
| 2,307,307 | Shoemaker | Jan. 5, 1943 |
| 2,398,253 | Rogers et al. | Apr. 9, 1946 |